Figure 4:
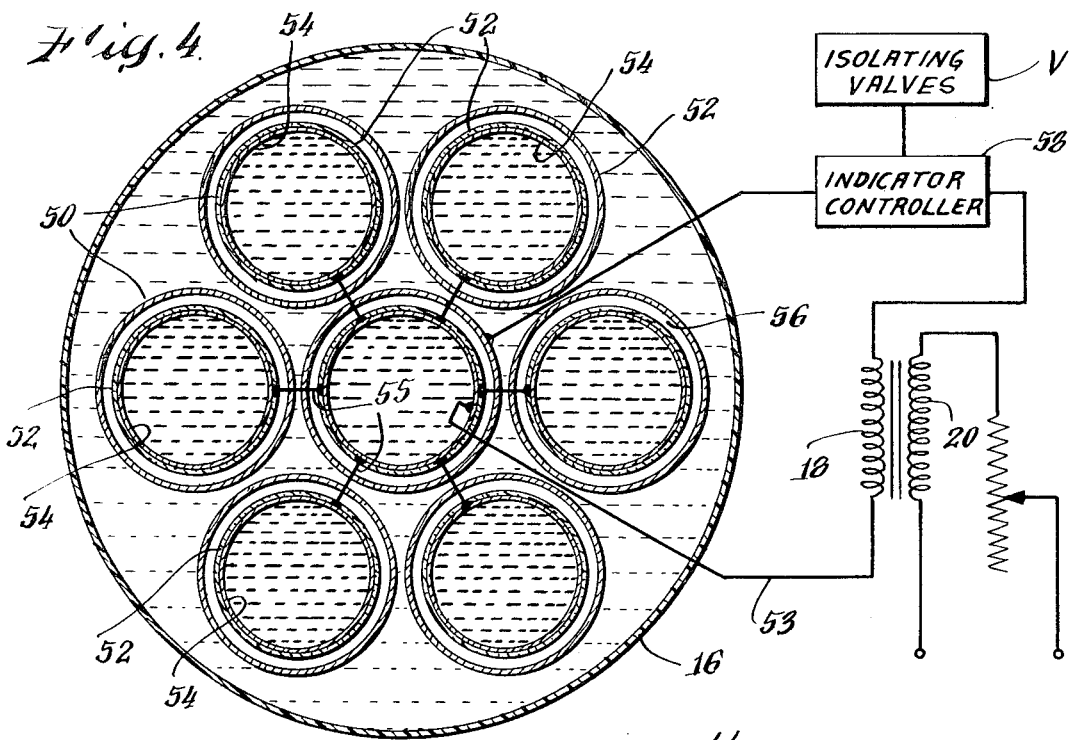

United States Patent [19]
Bollyky

[11] 3,766,051
[45] Oct. 16, 1973

[54] LIQUID COOLED OZONE GENERATOR

[75] Inventor: Joseph Bollyky, Stamford, Conn.

[73] Assignee: Pollution Control Industries, Inc., Stamford, Conn.

[22] Filed: Sept. 22, 1971

[21] Appl. No.: 182,681

[52] U.S. Cl.................. 204/321, 204/176, 204/320
[51] Int. Cl..................... C01b 13/10, C01b 13/12
[58] Field of Search.................... 204/321, 313–320, 204/322

[56] References Cited
UNITED STATES PATENTS

| | | | |
|---|---|---|---|
| 574,341 | 12/1896 | Pridham............................ | 204/321 |
| 1,316,342 | 9/1919 | Walden.............................. | 204/321 |
| 3,364,129 | 1/1968 | Cremer et al...................... | 204/321 |
| 3,551,321 | 12/1970 | Guillerd............................ | 204/321 |

Primary Examiner—F. C. Edmundson
Attorney—John W. Hoag

[57] ABSTRACT

An ozone generator module of the electirc discharge field type is provided having at least one cell comprising an assembly of three concentric tubular members, the inner and outer tubular members being electrodes separated by a tubular dielectric member spaced from one of the electrodes a distance sufficient to define a high density electric discharge zone between them, the cell or cells being disposed within a liquid container. Substantially optimum conditions for the production of ozone are provided by making the cross sectional dimension of the field uniform throughout to within a very small range of tolerance and by controlling the temperature of the electrodes by cooling them with liquid coolants one of which is a dielectric liquid, and limiting the density of the field by regulating the voltage across the field and the frequency employed.

4 Claims, 6 Drawing Figures

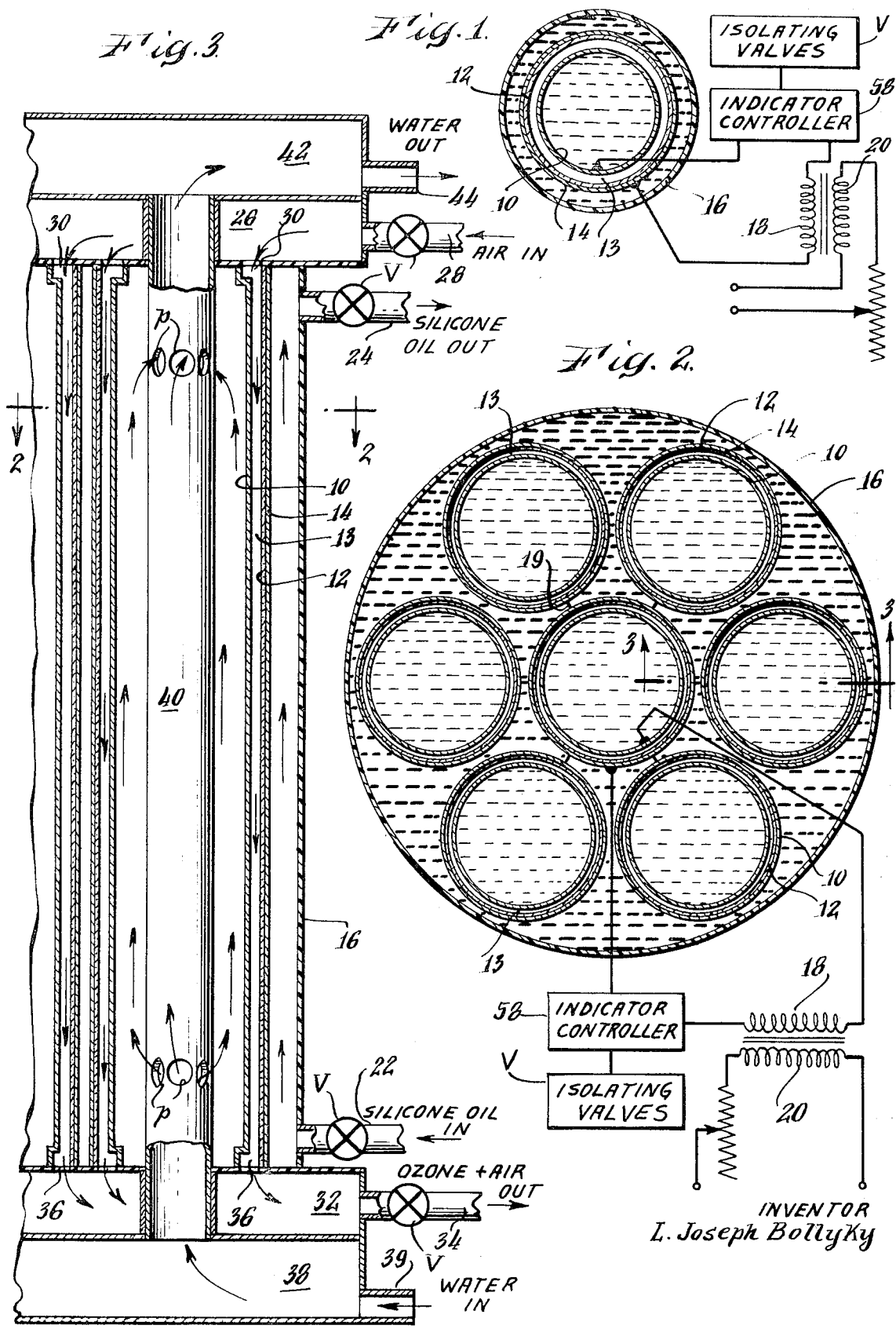

Patented Oct. 16, 1973 3,766,051

3 Sheets-Sheet 2

INVENTOR
L. Joseph Bollyky

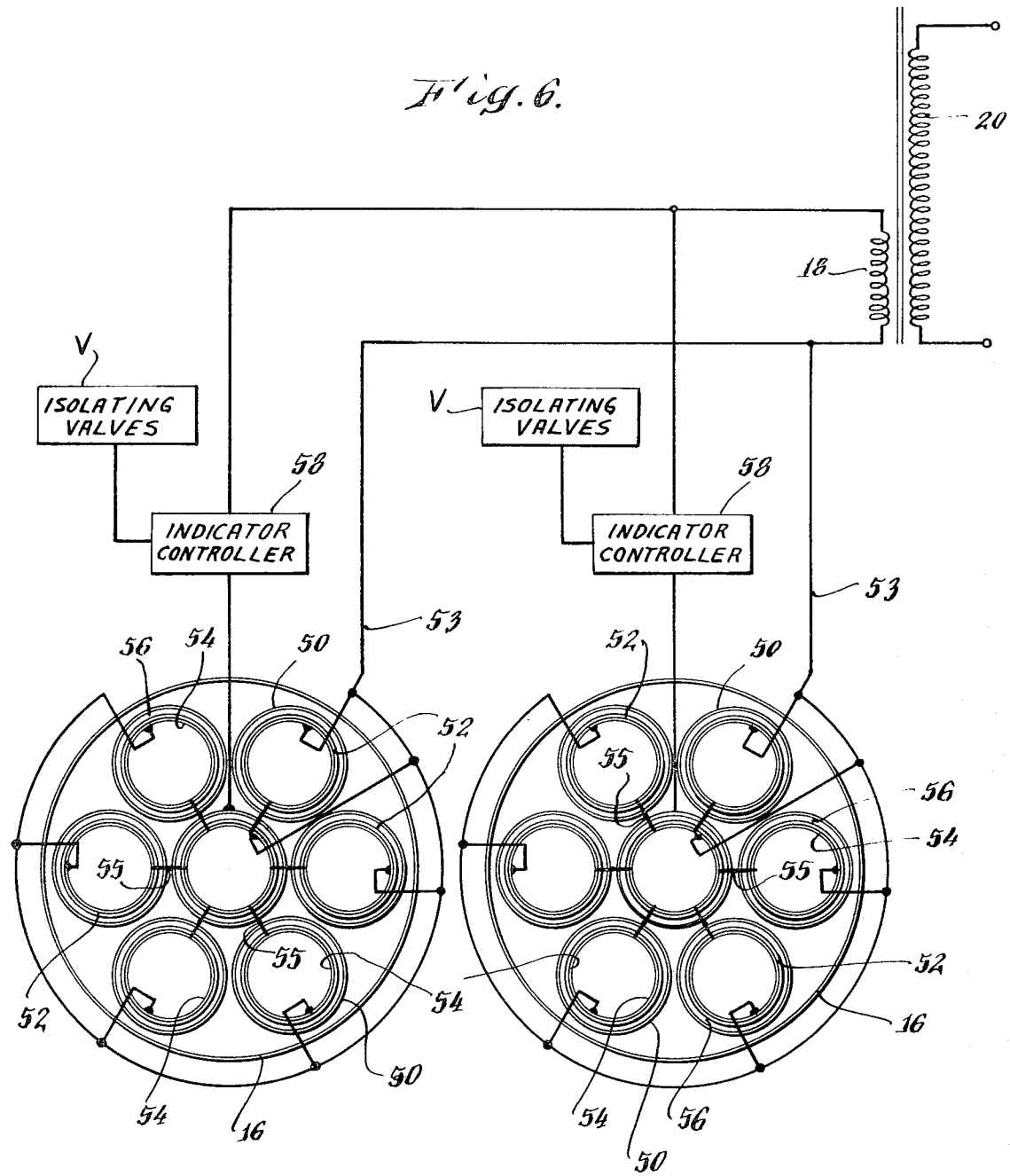

LIQUID COOLED OZONE GENERATOR

FIELD OF THE INVENTION

This invention relates to an ozone generator module and particularly to one of tubular form.

Ozone generators of the prior art have been very inefficient in the production of ozone relative to the size of the electrode surfaces employed, ane this has been true whether air or pure oxygen has been fed into the ozone producing field. The size and cost of equipment has therefore been high. When pure oxygen was employed instead of air the ozone output was twice as high as from air, but the cost of operation was greatly increased because of the cost of oxygen.

It is accordingly an object of this invention to substantially increase the production of ozone relative to the size of the electrode surfaces employed.

Another object of the invention is to provide apparatus and controls for its operation by which a very pronounced increase in the production of ozone relative to the size of the electrode surfaces may be obtained using air, or a mixture of air and oxygen, or a mixture of nitrogen and oxygen in which up to 65 percent of nitrogen is present.

A further object of the invention is to provide within a compact generating device a module a maximum of electrode surface which is practical from the point of view of cost of equipment.

SUMMARY OF THE DISCLOSURE

The terms "cell" and "ozone producing cell" are used herein to indicate a combination of three tubular members including two electrodes separated by a dielectric tube. One of the electrodes is a metal coating on one face of the dielectric tube.

The term "module" is used herein to mean one or more ozone producing cells disposed in a liquid container and connected within the same electric circuit.

The terms "air gap" and "ozone producing space" are used herein interchangeably.

In accordance with this invention one or more, preferably several, ozone producing units or cells are enclosed within a non-conductive liquid container thereby providing an ozone generator module. Two or more modules may be joined together, if desired, to form an ozone generator of increased capacity. In the preferred form of the structure shown in FIGS. 1, 2 and 3 each cell comprises a metal tube surrounded and spaced radially from a tube made of suitable dielectric material, such as glass, the outer surface of which is coated with metal. The metal tube (first electrode) and the metal coating (second electrode) are connected in an electric circuit to produce between them a high density electric discharge field. Gas comprising oxygen is caused to travel continuously through the space surrounding the metal tube, between the metal tube and the uncoated surface of the tube of dielectric material. A flow of cooling liquid which may be water is provided through the metal tube, and a flow of cooling dielectric liquid, which desirably may be silicone oil, is provided over the metal coating on the dielectric tube or tubes within the liquid container. For a module comprising two or more cells headers are provided for simultaneously supplying cooling liquid and gas comprising oxygen to each of the cells, and other headers are provided into which the cooling liquid and the gas comprising oxygen are simultaneously discharged from each of the cells.

Preferably the cooling agents are flowed counter current to the air of other feed gas comprising oxygen.

The distance across the electric discharge field is controlled by careful positioning and machining of the field defining tubes to made this distance uniform throughout the extent of the field to a tolerance on the order of ± 0.017 of an inch or less.

The temperature of the electrode surfaces is carefully controlled to maintain them preferably at a temperature on the order of 110° F. or less, by means of the liquid coolants and by controlling the power input of the field at a level which will permit the cooling liquids to maintain the temperature of the electrode surfaces as stated above. I have found that for accomplishing this result the power input employed should have an upper limit of 5,000 watts per square foot of electrode area, and that if this limit is exceeded the coolants cannot cool the electrodes sufficiently. I have found that the power input can be controlled within the upper limit of 5,000 watts per square foot of electrode area by limiting the voltage to within a range having 25,000 volts (RMS) as its upper limit and controlling the frequency employed to within a range having 5,000 cycles per second as its upper limit.

Figure 5:
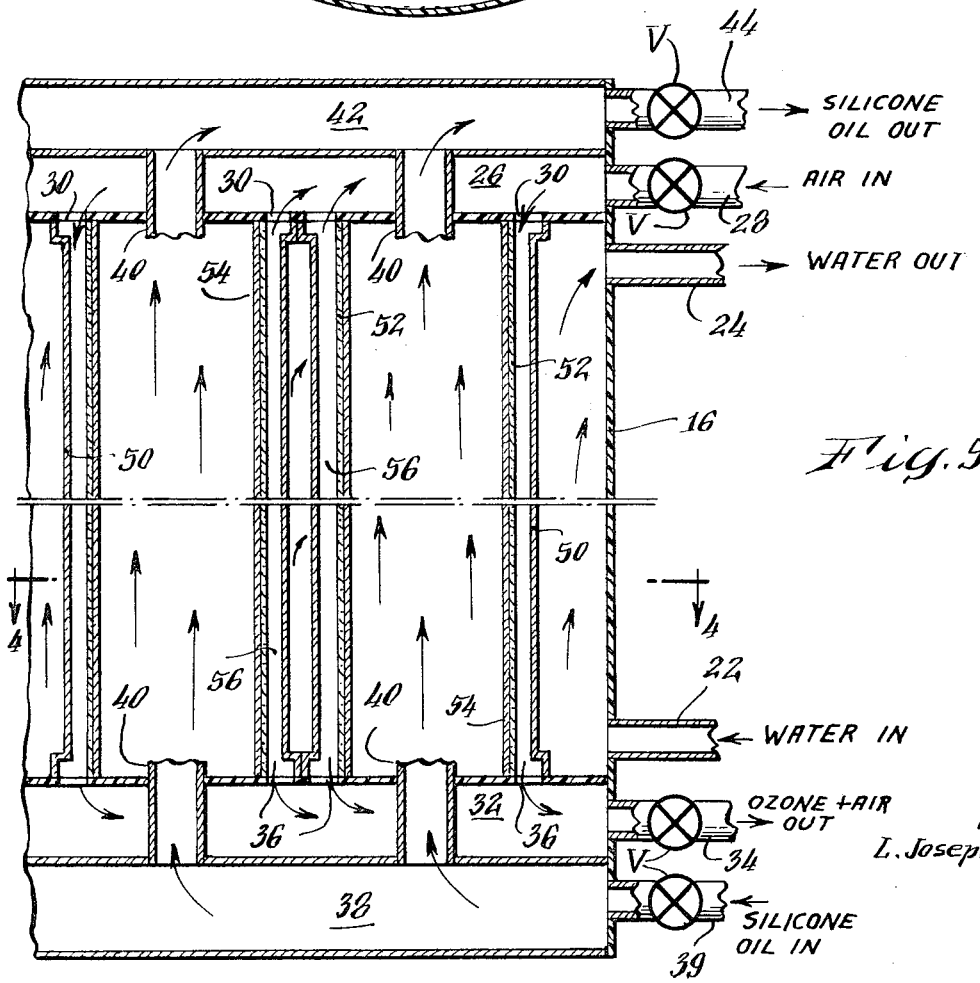

The invention will be best understood by reading the following description in connection with the drawings in which, FIG. 1 is a cross sectional view showing a module comprising a single ozone producing cell within a liquid container;

FIG. 2 is a cross section taken on the line 1—1 of FIG. 3 showing seven tubular ozone generating cells disposed in spaced parallel relation within a cylindrical liquid container;

FIG. 3 is a vertical sectional view of an embodiment of the invention showing cooling liquid and air headers disposed at either end of the body portion of the generator shown in FIG. 2, with cooling liquid and air inlets and outlets for the respective pairs of headers, and with inlet and outlet means for the liquid container body portion; this view is partially cut away to show in detail one generating unit or cell within the said surrounding liquid container and its connections with the headers;

FIG. 4 is a cross section taken on the line 4—4 of FIG. 5 showing a modification of the invention in which the position of the metal tube and the metal coating on one side of the dielectric tube are reversed with respect to the dielectric tube, the metal tube (first electrode) being the outer one of the three concentric tubular members and the metal coating (second electrode) being on the inside surface of the dielectric tube, and the air gap being between the outer uncoated face of the dielectric tube and the surrounding metal tube;

FIG. 5 is a vertical sectional view partly cut away of the embodiment of the invention shown in FIG. 4, and FIG. 6 is a schematic view showing a plurality of modules associated together to provide an increased volume of ozone each module being provided with an indicator-controller which will isolate the module if there is failure of the dielectric tube of any cell of the module.

DESCRIPTION

In the embodiment of the invention shown in FIG. 1 a single ozone producing cell is shown disposed in an electrically non-conductive liquid container 16 and surrounded by liquid therein. Desirably the liquid container may be made of any suitable plastic such for example as polyvinyl chloride.

In FIG. 2 and 3 a number of ozone producing cells are shown assembled within a liquid container 16, the cells being spaced sufficiently so that each of the cells is surrounded by liquid. The ozone producing cells shown in FIGS. 1, 2 and 3 each comprises a grounded metal tube 10, which may desirably be made of stainless steel, and is a first electrode which is spaced from, and surrounded by, a concentric tubular member 12 made of dielectric material, such for example as glass, the outer face of the dielectric tube having thereon a coating of metal 14 which is a second tubular electrode.

In the single cell embodiment of the invention shown in FIG. 1 the inner metal tube 10 is connected through ground to one end of the secondary 18 of a power transformer and the metal coating 14 on the outer surface of the dielectric tube is connected to the other end of the transformer secondary. The primary coil 20 of the transformer is connected to a source of high frequency and high voltage power supply, not shown, so that a high density electric discharge field can be provided within each air gap 13. When the electric circuit is energized a high density electric field will be created in the air gap 13 between the inner metal electrode 10 and the surrounding, concentric dielectric tube 12.

In the multiple cell modules of the kind illustrated in FIG. 2 and 3 the electric circuits through the air gaps 13 of these cells are completed by connecting the metal coating 14 of the center cell directly to the secondary of the transformer and connecting the metal coating 14 of the other cells to the metal coating 14 of the center cell by leads 19.

The function of the liquid container 16 is to maintain a body of cooling liquid in contact with the outer metal coating 14 on each tube 12 comprising the cell or cells. The liquid container 16 is provided with the liquid inlet 22 adjacent one end and with a liquid outlet 24 adjacent its other end so that a flow of cooling liquid can be provided through the space within it.

For multi-cell modules air and liquid coolant headers are provided at both ends of the cells for simultaneously supplying air into, and exhausting it from, the electric discharge zones or air gaps of all of the cells, and for simultaneously supplying cooling liquid into, and exhausting it from the inner tubular member of all of the cells.

An air supply header 26 having the inlet port 28 extends over the upper end of the cells and also extends over the upper end of the side wall of the liquid container 16 and forms the top of the liquid container. An air exhaust header 32, having the inlet port 34 extends over the lower ends of the cells and over the lower end of the liquid container side wall and forms the bottom of the liquid container. The air supply header 26 communicates with the air gaps 13 of all of the cells through the annular air ports 30 respectively, and similarly the air gaps of all of the cells communicate with the air discharge header 32 through the annular ports 36 respectively.

A cooling liquid supply header 38 having an inlet port 39 is disposed below the air discharge header, and cooling liquid discharge header 42 having the outlet port 44 is disposed above the air supply header 26, and conduits 40 extend from the liquid supply header 38 through the air discharge header 32 longitudinally and through each of the tubes 10 and through the air supply header 26 into communication with the cooling liquid discharge header 42. Each conduit 40 has two sets of ports $p, p$ opening into tubes 10 adjacent their respective ends.

In the multi-cell generator illustrated in FIG. 2 herein seven generating units are shown each comprising an inner metal tube 10 surrounded by a dielectric tube 12 having an outer facing of metal 14, and all seven of these units are shown surrounded by a tubular liquid container member 16. The units are spaced apart within the container 16 and the outer metal coated faces 14 of tubes 12 are all contacted by a cooling dielectric liquid such as silicone oil which is continuously circulated through tube 16 from an inlet port such as 22 shown in FIG. 3 to an outlet port such as 24. The dielectric liquid employed may be cooled as by a coil (not shown) of cold water while being circulated. It will be noted that the provision of a tubular liquid container surrounding one or several cells not only provides for cooling the entire electrode surface 14 of a single ozone producing cell, or the outer surfaces 14 of several ozone producing cells, but also conserves space so that the entire generator will be compact as well as efficient. In a multiple cell module from five to nine cells are preferred as a compromise between maximum electrode surface and the cost of the cells. I have found that while the addition of cells provides increased electrode surface the corresponding increase in efficiency begins to diminish when this number of cells is exceeded and the increase in cost makes the use of a greater number of cells impractical.

In FIGS. 4 and 5 the position of the electrodes in the tubular assembly comprising each cell is reversed. The outer electrode is a grounded metal tube 50, and the inner electrode is a metal coating 54 on the inner surface of the dielectric tubular member 52. The electric discharge field or air gap of each cell, into which the ozone producing gas is fed, is defined between the dielectric tube 52 and the surrounding, radially spaced metal tube 50. The transformer secondary is connected by lead 53 directly to the metal coating electrode 54 of each cell and the circuit through the air gap 56 of each cell is completed from the metal tubular electrode 50 through ground.

In a multi-cell module the transformer secondary is connected to the metal coating electrode 54 of one cell and this electrode is connected to the similar electrodes of each of the other cells by leads 55.

The other parts of the structure shown in FIGS. 4 and 5 may be the same as those shown in FIGS. 1 and 2 and like numerals are used to identify like parts. It will be understood that in this embodiment a dielectric liquid is supplied into the header 38 instead of water, to flow over the metal coatings 54 and that water may be circulated through the liquid container 16 instead of dielectric liquid. The supply and circulation of feed gas through the ozone producing air gaps will remain the same.

In FIG. 6 a plural number of modules are shown combined to provide a generator of greater power. Although the chance of breakdown of a cell in my device is greatly reduced due to the uniformity of the cross sectional dimension of the electric discharge field and the efficient cooling, it is desirable whether using a single module or a plural module generator to connect in the circuit of each module an indicator-controller 58 which may be of known kind to monitor the current drawn by the module, and to control the isolating valves V and shut off the flow of gas comprising oxygen into and out of the electric discharge space, and also the flow of dielectric coolant, in case of puncture or failure of the dielectric tube that leads to a high current stage.

An important factor in the success of my invention is that I control the distance across the discharge field to within a tolerance of ± 0.017 of an inch or less. This is accomplished by careful machining of the opposed surfaces defining the air gap and results in substantially avoiding puncture of the dielectric tube and providing a substantially trouble free structure and producing, along with temperature control, a condition which approaches the optimum as much as is practical keeping in mind the production expense of the equipment. It should be noted that without precision machining and using a standard metal tube and a standard 100 millimeter pyrex glass dielectric tube the air gap comprising the electric discharge field would have a tolerance of ± 0.073 inches or more.

dry air. So far as I know the most nearly comparable production of ozone by prior art apparatus and methods has been a production of from 3 to 6 grams of ozone per square foot of electrode surface per hour from dry air (−40° F. dew point), and from 5 to 20 grams of ozone per square foot of electrode surface per hour from dry oxygen. It will be noted that in this comparison the production of ozone per square foot of electrode area per hour is more than eight times the prior art production using dry air.

The following three tables denominated as EXAMPLE 1, EXAMPLE 2 and EXAMPLE 3, each comprises several experiments made with the apparatus disclosed herein using feed gas made up of various percentages of a combination of pure oxygen and dry air assumed to contain 80 percent nitrogen. These examples show that although with prior art ozonators when nitrogen was present in the feed gas in excess of 10 percent there was a drastic falling off in the amount of ozone produced this is not the case when using the apparatus and method taught herein; the ozone output per square foot of electrode area is astonishingly and unexpectedly high; and a surprisingly high conversion of feed gas to ozone is achieved.

EXAMPLE 1

| Feed gas | | | | Power input | | | Ozone output | | |
| --- | --- | --- | --- | --- | --- | --- | --- | --- | --- |
| $O_2$ (wt. percent) | $N_2$ (wt. percent) | Flow (s.c.f.h.) | Pressure (p.s.i.g.) | Volts (RMS) | Frequency (Hz.) | Power (watts) | $O_3$ (g. hr.$^{-1}$) (sq. ft.$^{-1}$) | $O_3$ (wt. percent) | Efficiency (kwh./lb. oz.) |
| 100 | 0 | 128 | 15 | 9,300 | 2,100 | 750 | 43 | 1.5 | 4.8 |
| 91.5 | 8.5 | 135 | 12 | 10,400 | 2,050 | 750 | 44 | 1.5 | 4.8 |
| 87.5 | 12.5 | 142 | 12 | 10,400 | 2,100 | 750 | 41.5 | 1.4 | 5.1 |
| 61 | 39 | 146 | 11 | 10,400 | 2,100 | 850 | 44 | 1.4 | 5.4 |
| 35 | 65 | 130 | 10 | 10,400 | 2,100 | 750 | 40 | 1.5 | 5.2 |
| 21 | 79 | 122 | 12 | 10,400 | 2,100 | 750 | 26 | 1.0 | 8.4 |
| 20 | 80 | 122 | 12 | 10,000 | 2,000 | 1,050 | 32 | 1.3 | 9.2 |

I have found that in order to obtain the suprisingly good results obtained in the operation of my device it is not only important to control the tolerance of the air gap to within ± 0.017 of an inch but also to maintain the temperature within the discharge field at not more than 110° F. I have realized this temperature by using liquid coolants to cool the electrodes and controlling the power density of the electric discharge field by keeping the power input to within a range having 5,000 watts per square foot of electrode surface area as its upper limit. Using water as one of the cooling liquids and using a dielectric liquid which is recycled and cooled with water as the other coolant, the liquid coolants cannot sufficiently reduce the temperature of the electrodes to provide a temperature of 110° F. or less in the electric discharge zone if a wattage in excess of 5,000 per square foot of electrode area is employed.

While the wattage is a function of the voltage across the discharge field and the frequency employed I have found that best results are obtained by controlling the voltage to within a range up to 25,000 volts (RMS) and the frequency to within a range up to 5,000 cycles per second.

I have found that ozone generators made and operated as taught herein produce ozone, either from the air or other gas comprising oxygen or from pure oxygen, with an efficiency never heretofore attained and which is truly surprising. With an oxony generator made and operated according to this invention I have produced in excess of 50 grams of ozone per square foot of electrode area per hour from −40° F. dew point The experiments of EXAMPLE 1 show that the ozone output, conversion and efficiency of the ozonator of this invention do not change substantially when the composition of feed gas is varied within a range of from 100 percent oxygen to a 35 percent oxygen - 65 percent nitrogen mixture. In contrast, prior art ozonators suffer substantial and increasing loss of efficiency as the nitrogen content in the oxygen-nitrogen feed exceeds 10 percent. See for example W. E. Cromwell and T. C. Manley, "Effect of Gaseous Diluents on Energy Yield of Ozone Generation from Oxygen", *Ozone Chemistry and Technology Advances in Chemistry Series*, No. 21, page 310, American Chemical Society, Washington, D. C., 1959, and curve reproduced below.

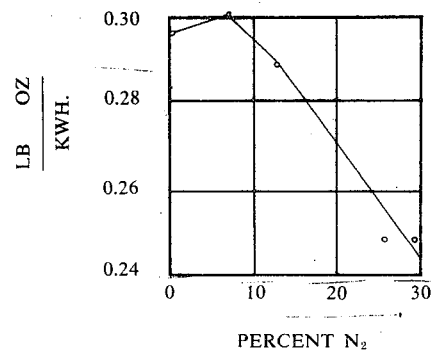

PERCENT $N_2$

EXAMPLE 2

| Feed gas | | | | Power input | | | Ozone output | | |
|---|---|---|---|---|---|---|---|---|---|
| $O_2$ (wt. percent) | $N_2$ (wt. percent) | Flow (s.c.f.h.) | Pressure (p.s.i.g.) | Volts (RMS) | Frequency (Hz.) | Power (watts) | $O_3$ (g. hr.$^{-1}$) (sq. ft.$^{-1}$) | $O_3$ (wt. percent) | Efficiency (kwh./lb. oz.) |
| 20 (air) | (80) | 356 | 15 | 12,000 | 2,000 | 1,500 | 52 | 0.7 | 8.2 |
| 20 (air) | (80) | 428 | 15 | 12,000 | 1,800 | 1,800 | 47 | 0.53 | 10.5 |
| 100 | 0 | 128 | 15 | 9,300 | 2,100 | 2,100 | 43 | 1.6 | 4.8 |

The experiments of EXAMPLE 2 show that the ozone output per square foot of electrode area of the ozonator of this invention is exceptionally high, 40–50 gr. hr.$^{-1}$(sq.ft.)$^{-1}$, from air or oxygen. In contrast prior art ozonators produced 3–6 gr. hr.$^{-1}$(sq.ft.)$^{-1}$ ozone or in some exceptional cases 8–20 gr.hr.$^{-1}$(sq.ft.)$^{-1}$ ozone from pure oxygen feed gas and approximately half as much from dry air. See *Ozone Chemistry and Technology, Advances in Chemistry Series*, No. 21, pp. 304–306, Americal Chemical Society, Washington, D. C., 1959 and U.S. Pat. No. 2,822,327.

EXAMPLE 3

| Feed gas | | | | Power input | | | Ozone output | | |
|---|---|---|---|---|---|---|---|---|---|
| $O_2$ (wt. percent) | $N_2$ (wt. percent) | Flow (s.c.f.h.) | Pressure (p.s.i.g.) | Volts (RMS) | Frequency (Hz.) | Power (watts) | $O_3$ (g. hr.$^{-1}$) (sq. ft.$^{-1}$) | $O_3$ (wt. percent) | Efficiency (kwh./lb. oz.) |
| 100 | 0 | 33.8 | 12 | 10,400 | 2,100 | 750 | 33.5 | 5.7 | 6.2 |
| 80 | 20 | 43.2 | 12 | 10,400 | 2,100 | 750 | 36.7 | 4.1 | 5.7 |
| 64 | 36 | 20.3 | 12 | 10,400 | 2,100 | 750 | 26.0 | 6.2 | 8.0 |
| 35 | 65 | 75.5 | 12 | 10,400 | 2,100 | 750 | 35.0 | 2.2 | 5.9 |
| 20 (air) | 80 | 122.0 | 12 | 10,000 | 2,000 | 1,050 | 31.3 | 1.3 | 9.2 |

In contrast to the exceptionally high conversion of feed gas to ozone shown above prior art ozonators could produce up to one per cent conversion from air and up to two per cent conversion from pure oxygen. See *Ozone Chemistry and Technology, Advances in Chemistry Series*, No. 21, pp. 304–306, American Chemical Society, Washington, D. C., 1959 and U.S. Pat. No. 2,822,317.

A measure of the unexpectedness of the results achieved by my apparatus and method of operation is the fact that they are achieved using a relationship between structural measurements and operating controls which is well outside the relationship recommended in said U.S. Pat. No. 2,822,327 and expressed as a mathematical formula therein.

There has thus been provided an ozone generator structure and method of operating it by which the above stated objects are accomplished in a thoroughly practical way.

What I claim is:

1. An ozone generator module comprising, a liquid container, an ozone producing cell disposed within the said container and comprising a pair of concentric tubular electrodes connected in a high frequency electric circuit and separated by a concentrically disposed dielectric tube, the dielectric tube being spaced from one of the said tubular electrodes providing an electric discharge zone, the distance between the tubes defining the discharge zone being uniform to within a tolerance of ± 0.017 of an inch throughout the said zone, means for flowing a gas comprising oxygen through the discharge zone, means for flowing a liquid coolant through said liquid container against a face of one of said electrodes, and means for flowing a liquid coolant through the other of said tubular electrodes, one of the liquids being a non-conductive liquid.

2. The ozone generator module claimed in claim 1 in which the inner electrode of the concentric tubular electrodes is a metal tube and the outer electrode is a metal coating on the outer surface of the dielectric tube.

3. The ozone generator module claimed in claim 1 comprising a plurality of said ozone producing cells disposed in said container and spaced apart from one another and from the container side wall so that a liquid coolant disposed within the container will surround the said cells and be in contact with one of the electrodes of each of the cells.

4. The ozone generator module claimed in claim 1 including valve means for controlling the flow of gas comprising oxygen through the cell, other valve means for controlling the flow of dielectric liquid coolant, and means connected in the electric circuit of the module for monitoring the current drawn by the module, and for controlling said valve means to cut out the flow of said gas and said dielectric coolant in case of dielectric tube failure.

\* \* \* \* \*

UNITED STATES PATENT OFFICE
CERTIFICATE OF CORRECTION

Patent No. 3,766,051           Dated October 16, 1973

Inventor(s) Joseph Bollyky

It is certified that error appears in the above-identified patent and that said Letters Patent are hereby corrected as shown below:

In the Abstract, line 1, "electirc" should read -- electric --.

Column 1, line 8, "ane" should read -- and --.

Column 1, line 26, before "module" change "a" to read -- or --.

Column 5, line 65, before "generator" change "oxony" -- ozone --.

Column 7, line 36, at the end of the first paragraph following Example 3, change Patent No. 2,822,317" to -- 2,822,327 --.

In Example 3, under the heading "Ozone output" and under the sub-heading "$O_3$(g. hr. -1)(sq. ft. -1)", the fifth and lowest figure in the column change "31.3" to -- 31.8 --.

Signed and sealed this 2nd day of April 1974.

(SEAL)
Attest:

EDWARD M. FLETCHER, JR.      C. MARSHALL DANN
Attesting Officer            Commissioner of Patents